Dec. 4, 1934.  S. LAMONICA ET AL  1,982,748
VEHICLE STEP
Filed Aug. 24, 1933
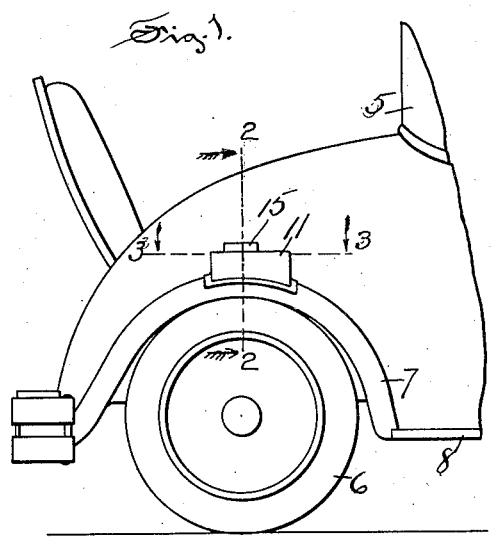
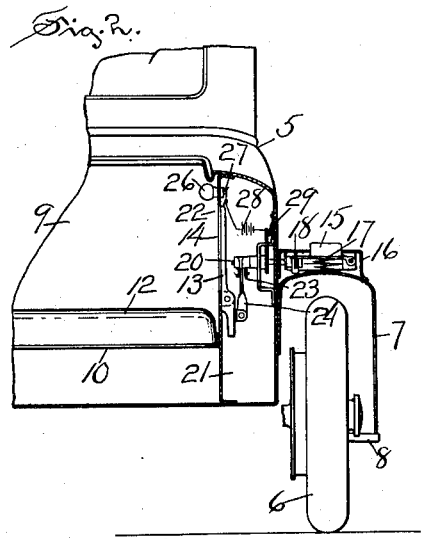
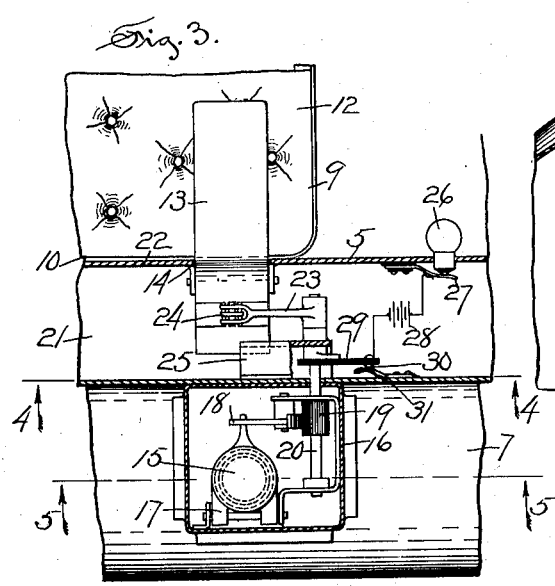
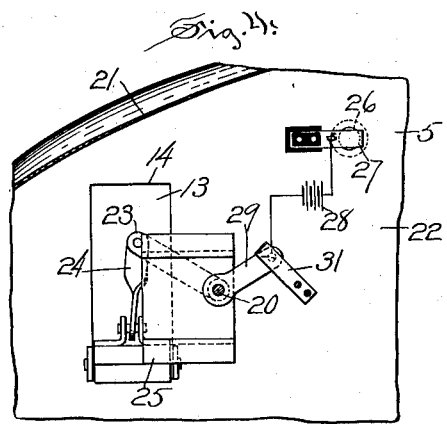
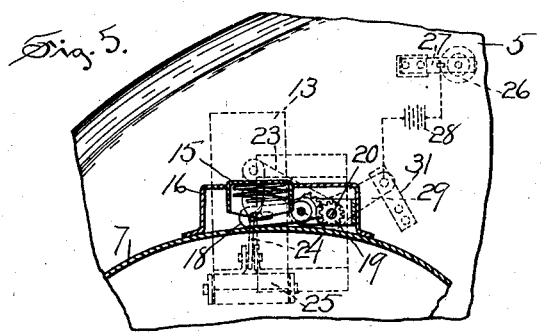

Patented Dec. 4, 1934

1,982,748

UNITED STATES PATENT OFFICE 1,982,748

VEHICLE STEP

Sebastiano Lamonica and Elio R. Caruso, Hartford, Conn.

Application August 24, 1933, Serial No. 686,576

8 Claims. (Cl. 280—166)

Our invention relates to the class of devices employed as an assistance in entering vehicles, and particularly automobiles, and has especial reference to a step for gaining access to the rumble seat of an automobile, and an object of our invention, among others, is the production of a device of this type that shall be effective in preventing injury to the seat cushion of the rumble of an automobile by people entering and leaving the rumble seat enclosure.

One form of a device embodying our invention and in the construction and use of which the objects herein set out, as well as others, may be attained, is illustrated in the accompanying drawing in which—

Figure 1 is a view in side elevation of the rear end of an automobile equipped with our improved step.

Figure 2 is a view in section on a plane denoted by the dotted line 2—2 of Fig. 1.

Figure 3 is a detail top view, scale enlarged, of a portion of the rumble seat opening of an automobile, with parts broken away to show construction.

Figure 4 is a view in section on a plane denoted by the dotted line 4—4 of Fig. 3.

Figure 5 is a view in section on a plane denoted by the dotted line 5—5 of Figure 3.

In the accompanying drawing the numeral 5 denotes a part of the rear portion of an automobile body, 6 a rear wheel, 7 a mud guard, 8 the running board, 9 a rumble seat opening and 10 the rumble seat of said automobile, all of which are of ordinary and well-known construction. In vehicles of this type entrance is gained to the rumble seat opening by means of a step 11 upon the mud guard 7 and from which step a foot is placed upon the cushion 12 of the rumble seat. This is injurious to the cushion and it is therefore our purpose to provide means which shall ensure that a person may enter the rumble seat opening without stepping upon the seat cushion.

To effect this purpose we provide a step 13 which is pivotally mounted in an opening 14 in the side wall of the rumble seat opening 9, said step being so positioned that when lowered by mechanism to be hereinafter described it will overlie the seat cushion 12, and as shown in Fig. 2 of the drawing. This step is so connected with a step button 15 placed upon the mud guard 7 that when said button is depressed the step will also be depressed to receive the foot of a person entering the rumble seat opening.

The connection between the step button 15 and the step 13 may comprise various arrangements of mechanism any one of which will embody our invention so long as pressure upon the button effects depression of said step. In an arrangement which we have found satisfactory a case 16 is located upon the mud guard 7, the button 15 projecting through an opening in the top of the case. Said button is attached to a step lever 17 pivotally supported at one end within the case and with its opposite end engaged with one end of an actuating lever 18 pivotally mounted within the case, the opposite end of said lever being formed as a toothed segment the teeth of which are engaged with a pinion 19 secured to an actuating shaft 20 rotatably mounted within the case 16 and projecting into a chamber 21 formed in the vehicle body and of which the side 22 of the rumble seat opening forms one wall.

An actuating arm 23 is secured at one end to the shaft 20 and its opposite end is connected as by means of a link 24 with the inner end of the step 13.

The button 15 is preferably spring pressed to its raised position, and as it is depressed, as by stepping upon it, the step lever 17 is also depressed rocking the toothed end of the lever 18 upwardly, thereby rotating the pinion 19 with the shaft 20 which raises the outer end of the actuating arm 23, causing the rear end of the step 13 to be raised and the opposite end thereof to be lowered into the position shown in Fig. 3. In this position a stop 25 is provided to receive the pressure caused by the weight of a person stepping upon the step.

For night service a lamp 26 is placed in position to shine upon the step 11, one terminal of the lamp being grounded upon the metallic frame of the vehicle and the other or central terminal being connected with a contact 27 insulated from the frame and connected with one pole of a battery 28. The other pole of the battery is electrically connected with a switch arm 29 secured to the shaft 20 and having a brush 30 adapted to engage a terminal 31 secured to the frame of the vehicle body. When the lever 17 is depressed the switch arm 29 will cause the brush 30 to engage the terminal 31, thereby completing the electric circuit and illuminating the lamp 26.

We claim:

1. In combination with the rumble seat of an automobile, a step movably mounted to overlie said seat, a step button mounted on the step provided for entrance to the rumble seat opening, and an operative connection between said button and step to effect movement of the latter by pressure upon the former.

2. In combination with the rumble seat of an automobile, a step pivotally mounted to overlie said seat, a step button mounted on the step provided for entrance to the rumble seat opening, and an operative connection between said button and step to effect pivotal movement of the latter by pressure upon the former.

3. In combination with the rumble seat of an automobile, a step movably mounted to overlie said seat, a step button mounted on the step provided for entrance to the rumble seat opening, a lamp positioned to disclose said step, and an operative connection between said button and pivotally mounted step to effect pivotal movement of the latter by pressure upon the former, said connection including a member movably mounted to illuminate said lamp.

4. In combination with the rumble seat and the step on the mud guard of an automobile, a step button movably mounted on said step, a step movably mounted to overlie said seat, and an operative connection between said button and movably mounted step to effect movement of the latter by pressure upon the former.

5. In combination with the rumble seat and mud guard of an automobile, a case mounted on said mud guard to form a step, a step button movably mounted in said case, a step movably mounted to overlie said seat, and an operative connection between said button and movably mounted step for operation of the latter by the former.

6. In combination with the rumble seat of an automobile, a movably mounted step housed in the side wall of the rumble seat opening, a step button mounted on the step provided for entrance to the rumble seat opening, and an operative connection between said button and movably mounted step to effect movement of the latter by pressure upon the former.

7. In combination with the rumble seat of an automobile, a step movably mounted to close an opening in the side wall of the rumble seat opening, a step button mounted on the step provided for entrance to the rumble seat opening, and an operative connection between said button and movably mounted step to effect movement of the latter by pressure upon the former.

8. In combination with the rumble seat of an automobile, a step pivotally mounted in an opening in the side wall of the rumble seat opening and adapted to project into a chamber behind said wall, a step button mounted on the step provided for entrance to the rumble seat of said opening, and an operative connection between that end of said pivotally mounted step within said chamber and said button to effect movement of said pivotally mounted step by pressure upon said button.

SEBASTIANO LAMONICA.
ELIO R. CARUSO.